(12) United States Patent
Cakulev et al.

(10) Patent No.: US 11,297,525 B2
(45) Date of Patent: Apr. 5, 2022

(54) ALLOCATION OF DATA RADIO BEARERS FOR QUALITY OF SERVICE FLOWS

(71) Applicant: Verizon Patent and Licensing Inc., Basking Ridge, NJ (US)

(72) Inventors: Violeta Cakulev, Milburn, NJ (US); Muthukumar Retnasamy, Tampa, FL (US); Ratul Kumar Guha, Warwick, PA (US); Sudhakar Reddy Patil, Flower Mound, TX (US); Kalyani Bogineni, Hillsborough, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

(21) Appl. No.: 16/947,853

(22) Filed: Aug. 20, 2020

(65) Prior Publication Data

US 2020/0382986 A1 Dec. 3, 2020

Related U.S. Application Data

(63) Continuation of application No. 16/255,241, filed on Jan. 23, 2019, now Pat. No. 10,785,674.

(51) Int. Cl.
*H04W 28/02* (2009.01)
*H04W 72/12* (2009.01)

(52) U.S. Cl.
CPC ... *H04W 28/0263* (2013.01); *H04W 28/0268* (2013.01); *H04W 72/12* (2013.01)

(58) Field of Classification Search
CPC ......... H04W 28/0263; H04W 28/0268; H04W 28/0257; H04W 28/0252; H04W 72/12; H04W 72/046; H04W 72/0413; H04W 72/04; H04W 72/02

USPC .................................................. 370/329–330
See application file for complete search history.

(56) References Cited

U.S. PATENT DOCUMENTS

| | | | |
|---|---|---|---|
| 2011/0261747 A1 | 10/2011 | Wang et al. | |
| 2015/0281999 A1* | 10/2015 | Zhu | H04W 28/0268 370/329 |
| 2017/0188270 A1 | 6/2017 | Shan et al. | |
| 2017/0208505 A1* | 7/2017 | Cheuk | H04L 43/16 |
| 2017/0347307 A1 | 11/2017 | Mehta et al. | |
| 2018/0041936 A1* | 2/2018 | Kim | H04L 5/0053 |
| 2018/0049218 A1 | 2/2018 | Hapsari et al. | |
| 2018/0324631 A1 | 11/2018 | Jheng et al. | |
| 2019/0166014 A1* | 5/2019 | Li | H04L 41/5003 |
| 2019/0230693 A1* | 7/2019 | Li | H04W 72/0493 |

(Continued)

*Primary Examiner* — Candal Elpenord

(57) ABSTRACT

An example method can include receiving information identifying a quality of service (QoS) flow for a communication session involving a user equipment (UE). The information can include a QoS profile and a QoS flow identifier (QFI). The method can include identifying, from a QoS profile, a QoS configuration identifier associated with the QoS flow and selecting a data radio bearer (DRB) for the communications associated with the QoS flow. The DRB can be selected based on a mapping of a plurality of DRBs to a plurality of QoS flows, and the mapping can be based on corresponding QoS configuration identifiers of the plurality of QoS flows. The method can include assigning the QoS flow to the DRB by adding the QFI of the QoS flow to the mapping relative to the DRB and causing the communications associated with the QoS flow to be transmitted using the DRB.

20 Claims, 8 Drawing Sheets

(56) References Cited

U.S. PATENT DOCUMENTS

| | | |
|---|---|---|
| 2019/0320362 A1 | 10/2019 | Liu et al. |
| 2019/0394830 A1 | 12/2019 | Mildh et al. |
| 2020/0068427 A1 | 2/2020 | Turtinen et al. |
| 2020/0112522 A1* | 4/2020 | Dannebro ............. H04W 36/14 |
| 2020/0146045 A1 | 5/2020 | Loehr et al. |
| 2021/0105657 A1* | 4/2021 | Hu .................... H04W 28/0268 |

* cited by examiner

QoS Flow Mapping

| DRB # | 5QI | QoS Flows (QFI) | ARP (Min) | PCI (If any QoS flow enabled, 0) | PVI (If all QoS flow enabled, 0) | GFBR/MFBR (sum) | MPLR (Min) |
|---|---|---|---|---|---|---|---|
| 0 | 4E | j, k, l, x, y, z | $ARP_j$ | 1 | 0 | GFBR, MFBR | --- |
| 1 | 1F | a, b, c, d, e | $ARP_c$ | 0 | 1 | --- | --- |
| 2 | 3A | f, g, h, i, s | $ARP_g$ | 1 | 1 | GFBR | $MPLR_f$ |
| 3 | 89 | m, n, o, p, q | $ARP_q$ | 0 | 1 | GFBR | $MPLR_o$ |
| ... | ... | ... | ... | ... | ... | ... | ... |

| DRB # | 5QI | QoS Flows (QFI) |
|---|---|---|
| 0 | 4E | j, k, l, x, y, z |
| 1 | 1F | a, b, c, d, e |
| 2 | 3A | f, g, h, i, s |
| 3 | 89 | m, n, o, p, q |
| ... | ... | --- |
| 12 | 06 | aa, bb |
| 13 | --- | xy, zt, tb |
| 14 | --- | cc, dc, ed |
| 15 | --- | ac, dy |

DRBs For Overflow 5QIs: { 13, 14, 15 }

QoS Flow Mapping

| GBR? | Delay Critical GBR? | Priority Level (H, L) | PDB (Min) | PER (Min) |
|---|---|---|---|---|
| --- | --- | --- | --- | --- |
| --- | --- | --- | --- | --- |
| --- | --- | --- | --- | --- |
| --- | --- | --- | --- | --- |
| --- | --- | --- | --- | --- |
| 1 | 1 | H | $PDB_{xy}$ | $PER_{xy}$ |
| 0 | 0 | L | $PDB_{dc}$ | $PER_{cc}$ |
| 1 | 0 | H | $PDB_{dy}$ | $PER_{dy}$ |

FIG. 1C

QoS Flow Mapping

| DRB # | QoS Flows (QFI) | ARP (Min) | GBR (GFBR, MFBR, non-GBR, etc.) | Priority (High/Low) | PDB | PER |
|---|---|---|---|---|---|---|
| 0 | j, k, l, x, y, z | $ARP_j$ | Non-GBR | H | $PDB_1$ | $PER_1$ |
| 1 | a, b, c, d, e | $ARP_c$ | $GFBR_1$, $MFBR_1$ | L | --- | $PER_3$ |
| 2 | f, g, h, i, s | $ARP_g$ | DC GBR | --- | $PDB_1$ | $PER_4$ |
| 3 | m, n, o, p, q | $ARP_q$ | $GFBR_2$, $MFBR_2$ | H | $PDB_2$ | $PER_2$ |
| ... | --- | --- | --- | --- | --- | --- |

ALLOCATION OF DATA RADIO BEARERS FOR QUALITY OF SERVICE FLOWS

RELATED APPLICATION

This application is a continuation of U.S. patent application Ser. No. 16/255,241, entitled "ALLOCATION OF DATA RADIO BEARERS FOR QUALITY OF SERVICE FLOWS," filed Jan. 23, 2019, which is incorporated herein by reference.

BACKGROUND

5G/New Radio (5G/NR) is a next generation global wireless standard. 5G/NR provides various enhancements to wireless communications, such as flexible bandwidth allocation, improved spectral efficiency, ultra-reliable low-latency communications (URLLC), beamforming, high-frequency communication (e.g., millimeter wave (mmWave)), and/or the like.

BRIEF DESCRIPTION OF THE DRAWINGS

FIGS. 1A-1D are diagrams of one or more example implementations described herein.

DETAILED DESCRIPTION OF PREFERRED EMBODIMENTS

Figure 1A:
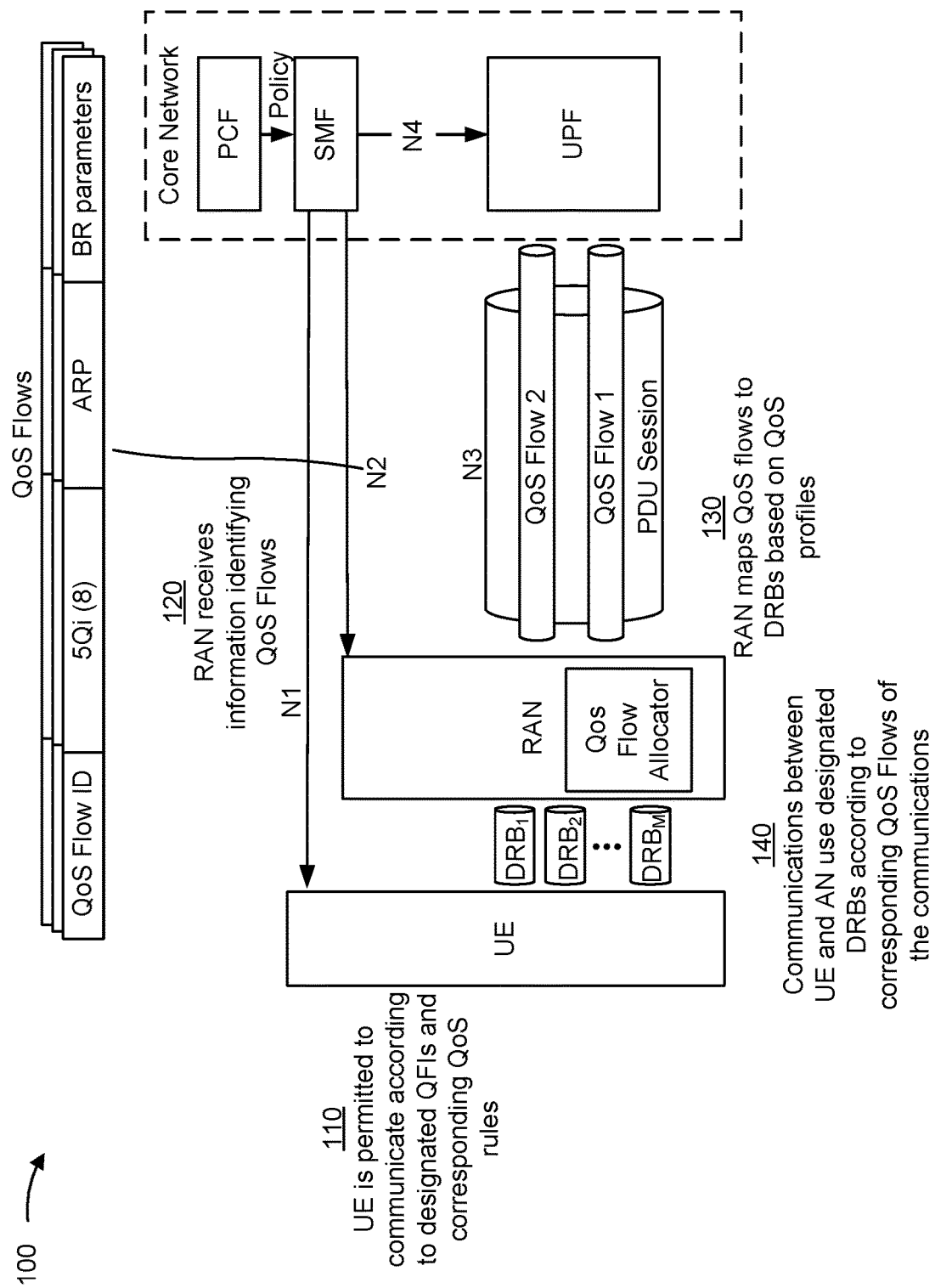

The following detailed description of example implementations refers to the accompanying drawings. The same reference numbers in different drawings can identify the same or similar elements.

In a wireless telecommunications system (which can be referred to herein as "the system"), a particular quality of service (QoS) can be provided for a data flow. Such a data flow, that is to receive a particular QoS can be referred to as a QoS flow. A QoS flow can be identified by a particular identifier, such as a QoS flow identifier (QFI). A QFI for a QoS flow can be communicated, within QoS information, to one or more devices (e.g., a user equipment (UE), a base station, a user plane function (UPF) and/or the like) of the wireless telecommunications system to indicate that communications associated with that QoS flow are to receive a QoS as described in the QoS information. In such cases, the QFI can be identified in a field of a communication that includes the QoS information. Furthermore, that field can have a limited number of bits (e.g., six bits, seven bits, eight bits, and/or the like), as defined by a standard. In some instances, the wireless telecommunications system maps QoS flows, at a one-to-one ratio, to resources (e.g., data radio bearers (DRBs)) of an access network. In such cases, the QFI of the QoS flows can be used within a mapping of the QoS flows to the resources. However, in the wireless telecommunications system, there can be fewer resources that can be used than the number of different possible QFIs (or the number of different types of data flows). For example, while there can be more than 250 possible QFIs, there might be only 20 or fewer resources to which the QoS flows can be mapped. Accordingly, in such cases, the number of different QoS flows can be limited to the number of resources. For example, if the size of the QFI field allows for 256 different QFIs (or different QFI values), rather than a possible 256 different QFIs being available for mapping to resources, previous techniques are limited to, for example, 16 different QoS flows if there are 16 resources, 29 different QoS flows if there are 29 resources, and so on.

According to some implementations described herein, QoS flows can be mapped to resources of an access network using a plurality of different QoS parameters, other than a QFI of the QoS flow. The QoS parameters can be indicated in a QoS profile of the QoS information. Using the plurality of different parameters permits a more granular mapping of QoS flows to the resources of the access network, relative to previous techniques, thus providing for a more efficient use of the resources and a wider variety of different possible types of QoS flows that can be mapped to the resources. As described herein, a wireless communication system, such as a 5G wireless telecommunications network, can permit the QoS profile to include a QoS configuration identifier and/or one or more QoS parameters that can be used to map QoS flows to resources of an access network. In this way, the QoS configuration identifier (e.g., a 5G QoS identifier (5QI)) can permit QoS flows that have a same QoS configuration identifier to be mapped to a same resource.

Accordingly, some implementations described herein can permit a more efficient mapping of QoS flows to resources, which can be referred to herein as DRBs, of an access network relative to previous techniques, by allowing for a greater variety of different types of QoS flows to be communicated through the access network at a particular time. In this way, computing resources associated with frequently replacing QoS flow mappings to add a new QoS flow to the mapping can be conserved. Furthermore, enabling more types of QoS flows to be mapped to an access network at a given time reduces the likelihood of dropping communications and enables more efficient use of radio resources. For example, communications involving QoS flows that are removed from the mapping due to the limited number of possible mappings of QoS flows, are less likely to be dropped, thus conserving computing resources and/or network resources associated with retransmitting data associated with the dropped communications or errors caused by the dropped communications.

FIGS. 1A-1D are diagrams of one or more example implementations 100 described herein. Example implementation(s) 100, in FIG. 1A, includes a wireless communication system with a core network that includes a policy and control function (PCF), a session mobility function (SMF), and a UPF, a user equipment (UE), and an access network (shown as a radio access network (RAN)). As further shown in FIG. 1A, a plurality of resources (DRB$_1$ through DRB$_M$, wherein M>1) enable communication between the UE and the RAN (or a base station of the RAN) and a communication session (e.g., a protocol data unit (PDU) session) is established, via an N3 interface, between the RAN and the UPF of the core network. As shown in the example mappings of FIGS. 1B-1D, one or more mappings of QoS flows to the plurality of resources can be maintained using one or more QoS parameters included within a QoS profile of a QoS flow.

As further shown in FIG. 1A, and by reference number 110, the UE is permitted to communicate data (e.g., transmit data and/or receive data) associated with QoS flows according to QFIs and/or corresponding QoS rules. The QFIs and/or QoS rules can be provided to the UE by the SMF of the core network via an N1 interface based on the UE requesting to communicate according to one or more QoS corresponding to the QFIs. The QFIs and/or QoS rules can be defined and/or enabled for the UE according to policies associated with the QoS flows and/or the UE (e.g., as maintained by the PCF). For example, the SMF (e.g., along with an access and mobility management function (AMF)) can perform one or more verifications and/or authentication processes of the UE in association with the requested QoS. Accordingly, the QFIs and/or QoS rules provided by the SMF to the UE can correspond to the QoS that is to be provided for QoS flows of the UE.

In this way, the UE can be authorized to transmit QoS flows through the RAN to transmit data via a PDU session associated with the core network.

As further shown in FIG. 1A, and by reference 120, the RAN receives information identifying the QoS flows. The RAN can receive the information, via the N2 interface, from the SMF and/or an AMF of the core network. In some implementations, the SMF can provide the QFIs and/or packet filter sets to the UPF to permit the UPF to apply corresponding QoS to the QoS flows of the PDU session.

As described herein, the information identifying the QoS flows can include a QFI and a QoS profile. Further, the QoS profile can include one or more of a QoS configuration identifier (shown as an 8 bit "5QI" in FIG. 1A), an allocation and retention priority (ARP), and one or more bitrate parameters (shown as "BR parameters"), which can indicate whether the QoS flow requires a guaranteed bit rate (GBR). In some implementations, one or more preemption indicators (e.g., a preemption capability indication (PCI), a preemption vulnerability indication (PVI), and/or the like) associated with the ARP can be included within the QoS profile. In some implementations, for non-GBR QoS flows, the bitrate parameters can include a reflective QoS attribute (RQA). In some implementations, for GBR QoS flows, the bitrate parameters can include one or more of a guaranteed flow bit rate (GFBR) (e.g., for uplink and/or for downlink), a maximum flow bitrate (MFBR) (e.g., for uplink and/or for downlink), a notification control, a maximum packet loss rate (MPLR) (e.g., for uplink and/or for downlink), and/or the like.

In this way, the RAN can obtain QoS profiles associated with QoS flows of communications involving the UE, to permit the UE to communicate with the RAN using one or more resources that are to be allocated for the QoS flows according to the QoS profiles.

As further shown in FIG. 1A, and by reference number 130, the RAN maps QoS flows to DRBs based on the QoS profiles. The RAN can include a QoS flow allocator that is configured to identify the QoS parameters of the QoS flow and map the QoS flows to DRBs of the RAN accordingly. In some implementations, the QoS flow allocator can be a component of a base station, a RAN scheduler, or another device of the RAN.

As described herein, the QoS flow allocator can maintain a mapping of QoS flows to DRBs of the RAN. The mapping can be maintained by the QoS flow allocator to permit the RAN to select a data radio bearer (DRB) for the communications associated with the QoS flow. For example, upon receipt of information identifying the QoS flow (or QFI and corresponding QoS profile), the QoS flow allocator can look up (e.g., search for, refer to, and/or the like), in the mapping, one or more QoS parameters of the QoS profile to determine which DRB is allocated for the one or more QoS parameters.

Based on the mapping indicating that a DRB is allocated for the one or more QoS parameters, the QoS flow allocator can map the QoS flow to the DRB to assign the QoS flow to the DRB. In other words, the QoS flow allocator can assign the QoS flow to the DRB by adding the QFI of the QoS flow to the mapping relative to the selected DRB for the QoS flow. In this way, when a communication, associated with the QoS flow, is to be transmitted or received by the RAN, the communication can be assigned to that DRB to cause the data of QoS flow to be transmitted and/or received using that DRB.

As described herein, the QoS flow allocator can generate and/or maintain the mapping according to one or more settings that indicate which QoS parameters of a QoS profile are to be used to map QoS flows to the resources of the RAN. For example, as described below in connection with FIGS. 1B-1D, the QoS flow allocator can map the QoS flows according to one or more different sets of QoS parameters of the QoS flows.

In this way, the RAN can configure a mapping of QoS flows to resources of the RAN based on QoS profiles of the QoS flows, to cause the UE to communicate with the RAN using resources defined by the mapping.

As further shown in FIG. 1A, and by reference number 140, communications between the UE and the RAN use the designated DRBs according to the corresponding QoS flows of the communications. Accordingly, for a communication involving a first QoS flow (shown as QoS flow 1), the UE can be assigned, by the RAN, to use a first DRB (e.g., $DRB_1$). Furthermore, for a communication involving a second QoS flow (shown as QoS flow 2), the UE can be assigned, by the RAN, to use a second DRB (e.g., a DRB other than $DRB_1$, such as one of $DRB_2$ to $DRB_M$).

In some implementations, a plurality of UEs can be configured to communicate with the UE according to the mapping of QoS flows to the DRBs. Accordingly, several UEs, associated with sending and/or receiving QoS flows having a same QoS configuration identifier and/or one or more other QoS parameters (e.g., QoS parameters that are the same or similar in that QoS parameters have a same or similar value (e.g., with a threshold range), have a same or similar setting (e.g., both enabled or disabled), and/or the like), can use a same DRB to communicate with the RAN when the communication involves those QoS flows.

In this way, the core network and/or the RAN can be configured to permit one or more UEs to communicate via designated resources of the RAN according to one or more QoS parameters of a QoS profile. Therefore, the core network and/or the RAN can be configured to map a greater variety of QoS flows to resources of the RAN to permit the one or more UEs to receive a greater variety of QoS from a wireless communication system.

As shown in FIG. 1B, and by reference number 130a, a mapping can provide that each DRB of a plurality of DRBs can be allocated for QoS flows that have a same QoS configuration identifier (shown as "5QI"). As shown in FIG. 1B, the mapping indicates that each DRB of the plurality of DRBs can be allocated for QoS flows that have a single, same QoS configuration identifier. Accordingly, multiple QoS flows that have a different QFI can be mapped to a same DRB if the multiple QoS flows are associated with and/or include a same QoS configuration identifier. As described herein, the QoS configuration identifier can be included within the QoS profile provided by the SMF.

As described herein, the QoS configuration identifier can be representative of one or more characteristics of the QoS that is to be provided for QoS flows associated with the QoS configuration identifier. Such characteristics can include one or more of: resource type (e.g., GBR or non-GBR), priority level (e.g., which can be any suitable range, such as 0-100) scheduling, packet delay budget (PDB), packet error rate (PER), and/or the like. As described herein, the one or more characteristics can correspond to one or more QoS parameters that are included in the QoS profile of the information identifying the QoS. The QoS configuration identifier can be configured for one or more types of services associated with the QoS flows. For example, a first QoS configuration identifier can be used to identify a QoS flow involving conversational voice, a second QoS configuration identifier can be used to identify real-time gaming and/or V2X messages, a third QoS configuration identifier can be used to one or more of voice service, live-streaming video, and/or interactive gaming, and so on. A standardized mapping of QoS configuration identifiers to corresponding characteristics of the QoS for the QoS configuration identifier and/or example services can be used by the UE, the RAN, and/or the core network to identify the characteristics of a QoS for a particular QoS configuration identifier.

In the example mapping of FIG. 1B, a first set of QoS flows j, k, l, x, y, z are associated with 5QI "4E," a second set of QoS flows a, b, c, d, e are associated with 5QI "1F," a third set of QoS flows f, g, h, i, s are associated with 5QI "3A," and a fourth set of QoS flows m, n, o, p, q are associated with 5QI "89." As further shown in the mapping, based on the 5QIs of the above QoS flows, the first set of QoS flows can be mapped to DRB 0, the second set of QoS flows can be mapped to DRB 1, the third set of QoS flows can be mapped to DRB 2, and the fourth set of QoS flows can be mapped to DRB 3.

As further shown by the mapping of FIG. 1B, the mapping can indicate a minimum ARP (e.g., a minimum ARP priority level) for QoS flows mapped to a corresponding DRB. For example, because one or more of the QoS flows, that are mapped to a particular DRB based on having the same 5QI, can have different ARPs, the RAN can set an ARP for each of the DRBs that corresponds to a minimum ARP of the QoS flows that are assigned to that DRB. In some implementations, for each DRB, the RAN can determine the minimum ARP based on analyzing (and/or comparing) the QoS profiles for each of the corresponding QoS flows mapped to the DRB and comparing the corresponding ARPs to identify the minimum ARP. As a specific example, assume that QoS flow j has the minimum ARP relative to the QoS flows of the first set of QoS flows. Accordingly, the RAN can set the ARP for the first set of QoS flows (and/or DRB 0) to be the ARP of QoS flow j (shown as "$ARP_j$"). In this way, the first set of QoS flows, which are mapped to DRB 0, can receive a QoS with an ARP that is different from an ARP that is identified in respective QoS profiles of the first set of QoS flows.

As further shown by the mapping of FIG. 1B, the mapping can indicate whether preemption capability and/or preemption vulnerability for QoS flows of the respective DRBs are to be enabled and/or disabled. For example, because one or more of the QoS flows, that are mapped to a particular DRB based on the 5QI, can have different settings for preemption capability and/or preemption vulnerability, the RAN can enable preemption capability and/or preemption vulnerability for each of the DRBs based on whether any of the QoS flows that are mapped to a particular DRB are to have preemption capability and/or preemption vulnerability enabled. In some implementations, for each DRB, the RAN can determine whether preemption capability and/or preemption vulnerability is to be enabled based on analyzing the QoS profiles for each of the corresponding QoS flows mapped the DRB. As a specific example, assume that one or more QoS flows of the first set of QoS flows has preemption vulnerability enabled, but none of the QoS flows of the first set of QoS flows has preemption capability enabled. Accordingly, preemption vulnerability can be enabled for the QoS flows mapped to DRB 0 (as shown by the "0"), and preemption capability is not to be enabled for the QoS flows mapped to DRB 0 (as shown by the "1"). As another specific example, assume that one or more of the QoS flows of the second set of QoS flows has preemption capability enabled, but none of the QoS flows of the second set of QoS flows has preemption vulnerability enabled. Accordingly, preemption capability can be enabled for QoS flows mapped to DRB 1 (as shown by the "0") and preemption vulnerability is not to be enabled for the QoS flows mapped to DRB 1 (as shown by the "1"). In this way, if a PCI of a QoS profile for a QoS flow indicates that preemption capability is to be enabled for the QoS flow, the mapping allows for the RAN to cause the DRB to provide a QoS that provides preemption capability (e.g., by enabling the preemption capability for that DRB). Furthermore, if a PVI of a QoS profile for a QoS flow indicates that preemption vulnerability is to be enabled for the QoS flow, the mapping allows for the RAN to cause the DRB to provide a QoS that provides preemption vulnerability (e.g., by enabling the preemption vulnerability for that DRB).

As further shown by the mapping of FIG. 1B, the mapping can indicate a GFBR and/or a MFBR for QoS flows of the respective DRBs. For example, because one or more of the QoS flows, that are mapped to a particular DRB based on having the same 5QI, can have different GFBRs and/or different MFBRs, the RAN can set GFBR and/or MFBR for each of the DRBs that corresponds to a sum of the GFBRs and/or a sum of the MFBRs of the QoS flows that are assigned to that DRB. In some implementations, for each DRB, the RAN can determine the GFBR sum and/or the MFBR sum based on analyzing (and/or comparing) the QoS profiles for each of the corresponding QoS flows mapped to the DRB and summing the corresponding GFBRs and/or MFBRs to identify the GFBR sum and/or MFBR sum. As a specific example, assume that QoS flows x, y, z have a GFBR and QoS flows k, l have an MFBR. Accordingly, the RAN can set the GFBR for the first set of QoS flows (and/or DRB 0) to be the sum of GFBRs of QoS flows x, y, z and the MFBR for the first set of QoS flows (and/or DRB 0) to be the MFBR of QoS flows k, 1. In this way, the first set of QoS flows, which are mapped to DRB 0, can receive a QoS with GFBR and/or MFBR that is different from a GFBR that is identified in respective QoS profiles of the first set of QoS flows. As another example, assume that none of the QoS flows of the second set of QoS flows have a GFBR and/or an MFBR set. Accordingly, as shown, a GFBR and/or MFBR is not set for DRB 1.

As further shown by the mapping of FIG. 1B, the mapping can indicate a minimum MPLR for QoS flows mapped to corresponding DRBs. For example, because one or more of the QoS flows, that are mapped to a particular DRB based on having the same 5QI, can have different MPLRs, the RAN can set an MPLR for each of the DRBs that corresponds to a minimum MPLR of the QoS flows that are assigned to that DRB. In some implementations, for each DRB, the RAN can determine the minimum MPLR based on analyzing (and/or comparing) the QoS profiles for each of the corresponding QoS flows mapped to the DRB and comparing the corresponding MPLRs to identify the minimum MPLR. As a specific example, assume that QoS flow f has the minimum MPLR relative to the QoS flows of the third set of QoS flows. Accordingly, the RAN can set the MPLR for the first set of QoS flows to be the MPLR of QoS flow f (shown as "MPLR$_f$"). In this way, the third set of QoS flows, which are mapped to DRB 2, can receive a QoS with an MPLR that is different from an MPLR that is identified in respective QoS profiles of the third set of QoS flows.

In some implementations, the mapping can map QoS flows that have a same 5QI and one or more of the other parameters of the QoS profile (e.g., ARP, GFBR, MFBR, MPLR, and/or the like). For example, QoS flows with a first 5QI and a first ARP can be mapped to a first DRB and QoS flows with the first 5QI and a second ARP (that is different from the first ARP) can be mapped to a second DRB (that is different from the first DRB). Although example implementations are described above in connection with determining an ARP, a PCI, a PVI, a GFBR/MFBR, and/or an MPLR, one or more other techniques or implementations can be used.

In this way, the example mapping of FIG. 1B can permit a RAN to map QoS flows based on QoS configuration identifiers associated with the QoS flows. While mapping the QoS flows according to the QoS configuration identifier can limit a number of different QoS configuration identifiers for QoS flows (e.g., to the number of resources, if mapped in a one-to-one manner), using the QoS configuration identifier can permit more QoS flows to be mapped, relative to using the QFI, because different QFIs can be associated with a same QoS configuration identifier. Furthermore, the example mapping of FIG. 1B provides a relatively simple analysis and/or process for mapping QoS flows that would conserve resources (e.g., computing resources, such as processing resources and/or memory resources) associated with analyzing the QoS profiles to map the QoS flows based on a plurality of other QoS parameters.

In FIG. 1C, as shown by reference number 130*b*, a mapping can provide that a first set of DRBs are to be used to allocate QoS flows in a first particular manner and a second set of DRBs that are to be used to allocate QoS flows in a second particular manner. As shown in FIG. 1C, the RAN can use 16 DRBs (DRB 0 through DRB 15), although, in some implementations, the RAN may be able to use more or fewer DRBs. In the example of FIG. 1C, the first 13 DRBs (DRB 0 through DRB 12) can map QoS flows according to one or more of the examples described above in connection with FIG. 1B. For example, once the first 13 DRBs are mapped according to 5QIs of received QoS profiles, the RAN can begin mapping QoS flows based on one or more other types of QoS parameters of the QoS profiles. For example, any subsequently received QoS flows that have 5QIs that are different from the 5QIs of QoS flows mapped to DRBs 0-12, can be mapped to one or more of the remaining DRBs 13-15 based on one or more other QoS parameters of the QoS profile for those QoS flows.

In the example mapping of FIG. 1C, the RAN can map QoS flows that have a 5QI that is different from the 5QIs of the QoS flows mapped to DRBs 0-12 (which can be referred to in this example as an "unmapped 5QI") based on whether the QoS profile indicates that the QoS flow is configured with a GBR, whether the QoS flow has a priority level, and whether the QoS flow has a delay critical GBR. Therefore, for each QoS flow that is received with an unmapped 5QI, the RAN can inspect the QoS profile to identify any GBR, any priority level, and/or any delay critical GBR to map the QoS flow to a DRB accordingly. A priority level can include a range and/or a set of ranges of the range (e.g., high, medium, low, and/or the like).

In the example mapping of FIG. 1C, a fifth set of QoS flows xy, zt, tb can be mapped to DRB 13, a sixth set of QoS flows cc, dc, ed can be mapped to DRB 14, and a seventh set of QoS flows ac, dy can be mapped to DRB 15. As described above, each of the fifth set of QoS flows can have a different QoS configuration identifier from one another, each of the sixth set of QoS flows can have a different QoS configuration identifier from one another, and each of the seventh set of QoS flows can have a different QoS configuration identifier from one another.

As shown in FIG. 1C, the fifth set of QoS flows are to have a GBR, a delay critical GBR, and a high (H) priority (e.g., greater than a threshold priority level). Further, the QoS flows of the sixth set of QoS flows do not involve a GBR or delay critical GBR and have a low (L) priority level (e.g., less than a threshold priority level). The QoS flows of the seventh set of QoS flows are to have a GBR, might not have a delay critical GBR, and have a high priority level. Accordingly, for any QoS flow with an unmapped QoS configuration identifier, the RAN can map those QoS flows to DRBs 13-15 according to the QoS parameters of the QoS flows of DRBs 13-15.

Furthermore, because QoS flows of DRBs 13-15 can be associated with different QoS configuration identifiers, the RAN can set a minimum PDB and/or a minimum PER for each of DRBs 13-15 that corresponds to a minimum PDB and/or a minimum PER of the respective QoS flows that are correspondingly mapped to each of DRBs 13-15. For example, for each of DRBs 13-15, the RAN can determine whether any of the QoS configuration identifiers of each of DRBs 13-15 are associated with a PDB, and/or a PER (e.g., by referring to a standardized mapping of QoS configuration identifiers to PDB and/or PER for the QoS configuration identifiers, as described above). In such a case, if any of the QoS flows have a PDB and/or PER, the RAN can be configured to select the minimum PDB and/or minimum PER associated with the respective QoS flows that are correspondingly mapped to each of DRBs 13-15. As a specific example, assume the QoS configuration identifier for QoS flow xy has a PDB and a PER and that the PDB and the PER for QoS flow xy is the minimum of the QoS flows of the fifth set of QoS flows. Accordingly, the RAN can set the PDB and/or the PER for the fifth set of QoS flows (and/or DRB 13) to be the PDB for QoS flow xy and the PER for QoS flow xy, respectively.

In this way, for one or more DRBs (shown as DRBs for unmapped 5QIs), the RAN can map QoS flows according to one or more other QoS parameters other than the QoS configuration identifier of the QoS flows. Accordingly, the QoS flows can be mapped to a DRB regardless the QoS configuration identifier for a QoS flow. Accordingly, the mapping of FIG. 1C can permit a relatively simplistic mapping for a first set of DRBs (which can conserve computing resources associated with analyzing QoS parameters of the QoS profiles to map the QoS flows) without limiting the different number of QoS flows to the number of resources of the RAN by using a second set of DRBs that can be mapped regardless of the QoS configuration. In this way, the second set of DRBs does not limit the number of different QoS configuration identifiers for QoS flows to the number of resources of the RAN, thus allowing for greater variety of QoS flows and efficient use of DRBs 0-15.

As shown in FIG. 1D, and by reference number 130*c*, a mapping can provide that each DRB of the plurality of DRBs of the RAN can be allocated for QoS flows based on one or more QoS parameters of the QoS flows. As shown in FIG. 1D, the mapping indicates that each DRB of the plurality of DRBs can be allocated for QoS flows that have the same or similar QoS parameters. In the example mapping of FIG. 1D, the example set of QoS parameters used to map QoS flows to DRBs include ARP, resource type (e.g., associated with GBR, non-GBR, MFBR, delay critical GBR (shown as DC GBR), and/or the like), priority, PDB, and PER. Additionally, or alternatively, the mapping can map QoS flows to DRBs based on a GBR parameter (e.g., the value of the GBR), a default maximum data burst volume, a default averaging window, an RQA (for non-GBR), a PCI, a PVI, and/or the like. According to the mapping of FIG. 1D, the RAN can analyze and/or consider any or all QoS parameters of QoS flows.

To generate the mapping of FIG. 1D, the RAN can analyze the QoS parameters of QoS flows that are received in the QoS profile and/or represented by the QoS configuration identifier. The RAN can compare the QoS parameters to the groups of QoS parameters in the mapping to determine which DRB is to be mapped to the QoS flow, and, thus, which DRB is to be used for communications involving the QoS flow. To determine the similarity between the QoS parameters of a QoS flow and one or more sets of QoS parameters of the mapping, the RAN can apply one or more scores to the QoS parameters based on the similarities between corresponding QoS parameters and/or based on discrete ranges of corresponding QoS parameters. In some implementations, when applying the scores to the QoS parameters, the RAN can apply a weight to the QoS parameters according to one or more preferences and/or settings. Accordingly, the RAN can determine, for each received QoS flow and based on any number of QoS parameters of the QoS flow, which DRB is to be mapped to the QoS flow, and thus which DRB is to be used for communication involving the QoS flow.

In this way, the RAN can map QoS flows to DRBs based on one or more QoS parameters of the QoS flow. Accordingly, the RAN can allow for mapping of QoS flows to DRBs without being limited by the number of DRBs of the RAN. Therefore, a greater number of different QoS flows that provide a greater variety of QoS can be mapped to DRBs, thus allowing for efficient use of the DRBs and/or a greater number of services relative to other techniques.

Accordingly, as described herein in connection with example implementation(s) 100, the RAN can use a mapping of QoS flows to DRBs using a QoS configuration identifier and/or one or more other QoS parameters. In this way, a greater variety of QoS and/or corresponding services, can be offered by a wireless communication system, thus allowing for more efficient use of resources (e.g., DRBs), relative to previous techniques, by enabling a more granular allocation of resources the wireless communication system. Such granularity prevents wasting resources on communications and/or QoS flows that do not require one or more QoS parameters of a QoS that must be assigned to those communications and/or QoS flows because of the limited number of different QoS flows offered by the previous techniques.

As indicated above, FIGS. 1A-1D are provided as examples. Other examples can differ from what is described with regard to FIGS. 1A-1D.

Figure 2:
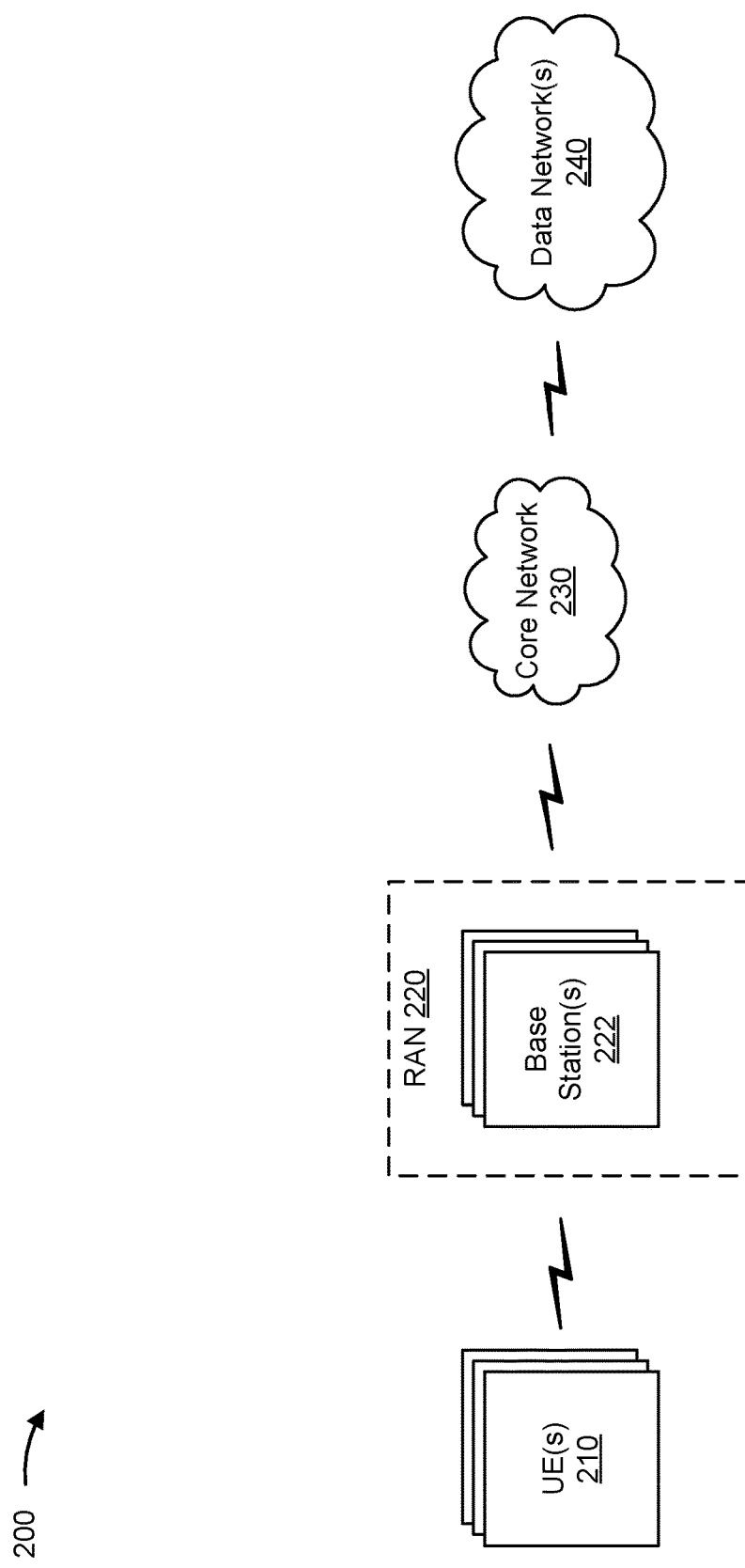
FIG. 2 is a diagram of an example environment in which systems, functional architectures, and/or methods described herein can be implemented.

FIG. 2 is a diagram of an example environment 200 in which systems and/or methods, described herein, can be implemented. As shown in FIG. 2, environment 200 can include a UE 210, a RAN 220, a base station 222, a core network 230, and/or a data network 240. Devices of environment 200 can interconnect via wired connections, wireless connections, or a combination of wired and wireless connections.

UE 210 can include one or more devices capable of communicating with base station 222 and/or a network (e.g., RAN 220, core network 230, data network 240, and/or the like). For example, UE 210 can include a wireless communication device, a radiotelephone, a personal communications system (PCS) terminal (e.g., that can combine a cellular radiotelephone with data processing and data communications capabilities), a smart phone, a laptop computer, a tablet computer, and/or a similar device. UE 210 can be capable of communicating using uplink (e.g., UE to base station) communications, downlink (e.g., base station to UE) communications, and/or sidelink (e.g., UE-to-UE) communications. In some implementations, UE 210 can include a machine-type communication (MTC) UE, such as an evolved or enhanced MTC (eMTC) UE. In some implementations, UE 210 can include an Internet of Things (IoT) UE, such as a narrowband IoT (NB-IoT) UE and/or the like. UE 210 can correspond to the UE of example implementation 100.

RAN 220 can include a base station and be operatively connected, via a wired and/or wireless connection, to the core network 230. RAN 220 can facilitate communication sessions between UEs and data network 240 by communicating application-specific data between RAN 220 and core network 230. Data network 240 can include various types of data networks, such as the Internet, a third-party services network, an operator services network, a private network, a wide area network, and/or the like. RAN 220 can correspond to the RAN of example implementation 100.

Base station 222 includes one or more devices capable of communicating with UE 210 using a cellular radio access technology (RAT). For example, base station 222 can include a base transceiver station, a radio base station, a node B, an evolved node B (eNB), a gNB, a base station subsystem, a cellular site, a cellular tower (e.g., a cell phone tower, a mobile phone tower, etc.), an access point, a transmit receive point (TRP), a radio access node, a macrocell base station, a microcell base station, a picocell base station, a femtocell base station, or a similar type of device. Base station 222 can transfer traffic between UE 210 (e.g., using a cellular RAT), other base stations 222 (e.g., using a wireless interface or a backhaul interface, such as a wired backhaul interface), and/or data network 240. Base station 222 can provide one or more cells that cover geographic areas. Some base stations 222 can be mobile base stations. Some base stations 222 can be capable of communicating using multiple RATs.

In some implementations, base station 222 can perform scheduling and/or resource management for UEs 210 covered by base station 222 (e.g., UEs 210 covered by a cell provided by base station 222). In some implementations, base stations 222 can be controlled or coordinated by a network controller, which can perform load balancing, network-level configuration, and/or the like. The network controller can communicate with base stations 222 via a wireless or wireline backhaul. In some implementations, base station 222 can include a network controller, a self-organizing network (SON) module or component, or a similar module or component. In other words, a base station 222 can perform network control, scheduling, and/or network management functions (e.g., for other base stations 222 and/or for uplink, downlink, and/or sidelink communications of UEs 210 covered by the base station 222). In some implementations, base station 222 can include a central unit and multiple distributed units. The central unit can coordinate access control and communication with regard to the multiple distributed units. The multiple distributed units can provide UEs 210 and/or other base stations 222 with access to data network 240. Base station 222 can be a base station of the RAN of example implementation 100 and/or can be capable of performing one or more of the processes (e.g., mapping QoS flows to DRBs) described above in connection with example implementation 100.

Core network 230 can include various types of core network architectures, such as a 5G next generation (NG) Core (e.g., a core network of FIG. 3), a Long-Term Evolution (LTE) Evolved Packet Core (EPC), and/or the like. In some implementations, core network 230 can be implemented on physical devices, such as a gateway, a mobility management entity, and/or the like. In some implementations, the hardware and/or software implementing core network 230 can be virtualized (e.g., through use of network function virtualization and/or software-defined networking), thereby allowing for the use of composable infrastructure when implementing core network 230. In this way, networking, storage, and compute resources can be allocated to implement the functions of core network 230 in a flexible manner as opposed to relying on dedicated hardware and software to implement these functions. Core network 230 can correspond to the core network of example implementation 100.

Data network 240 includes one or more wired and/or wireless data networks. For example, data network 240 can include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 2 are provided as one or more examples. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
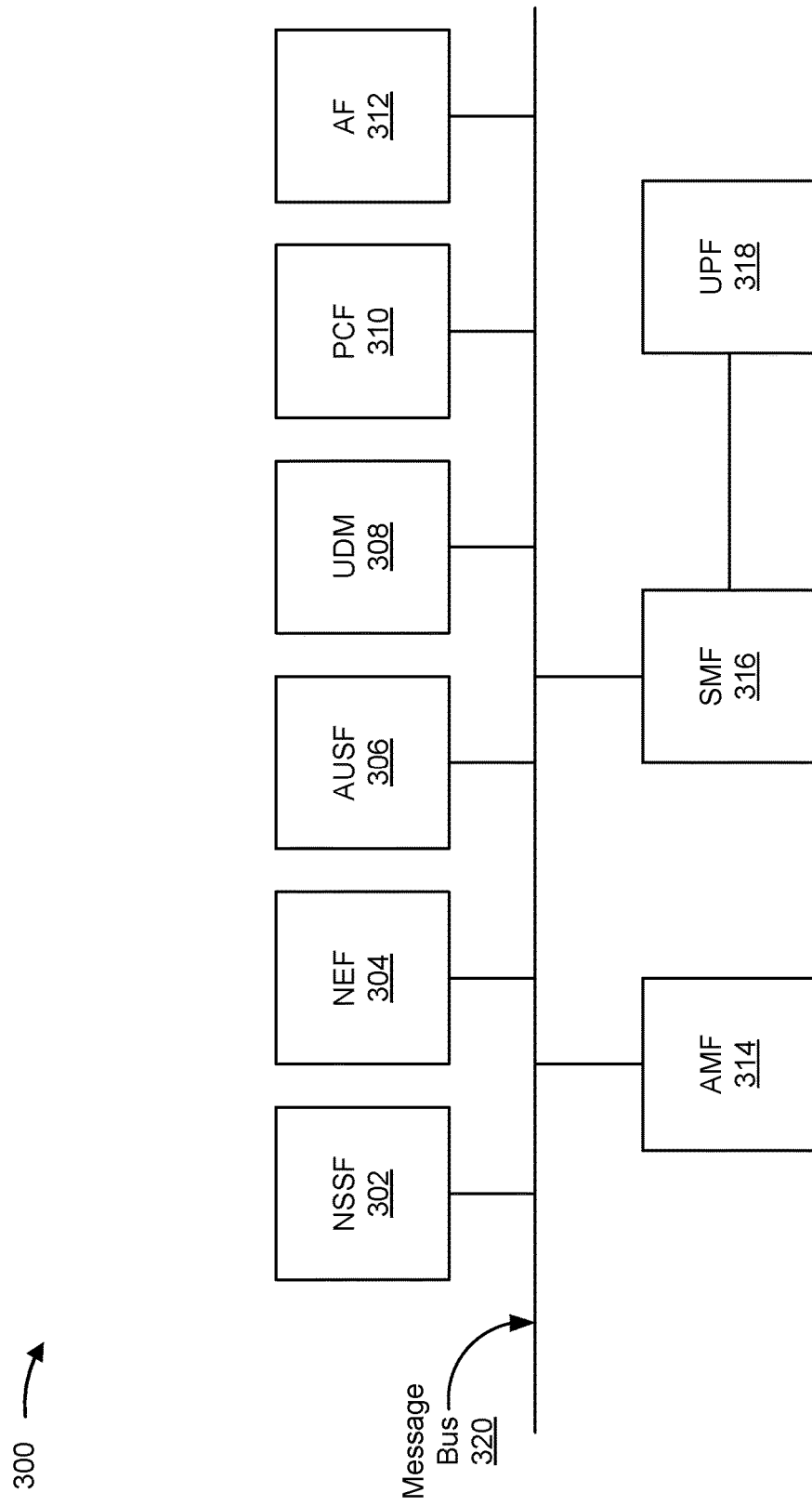
FIG. 3 is a diagram of an example functional architecture of an example core network described herein.

FIG. 3 is a diagram of an example functional architecture of a core network 300 in which systems and/or methods, described herein, can be implemented. For example, FIG. 3 can show an example functional architecture of a 5G NG core network included in a 5G wireless telecommunications system. In some implementations, the example functional architecture can be implemented by a core network (e.g., core network 230 of FIG. 2) and/or one or more of devices (e.g., a device described with respect to FIG. 4). While the example functional architecture of core network 300 shown in FIG. 3 can be an example of a service-based architecture, in some implementations, core network 300 can be implemented as a reference-point architecture.

As shown in FIG. 3, core network 300 can include a number of functional elements. The functional elements can include, for example, a network slice selection function (NSSF) 302, a network exposure function (NEF) 304, an authentication server function (AUSF) 306, a unified data management (UDM) component 308, a PCF 310, an application function (AF) 312, an AMF 314, a SMF 316, and a UPF 318. These functional elements can be communicatively connected via a message bus 320, which can be comprised of one or more physical communication channels and/or one or more virtual communication channels. Each of the functional elements shown in FIG. 3 is implemented on one or more devices associated with a wireless telecommunications system. In some implementations, one or more of the functional elements can be implemented on physical devices, such as an access point, a base station, a gateway, a server, and/or the like. In some implementations, one or more of the functional elements can be implemented on one or more computing devices of a cloud computing environment associated with the wireless telecommunications system. In some implementations, the core network 300 can be operatively connected to a RAN 220, a data network 240, and/or the like, via wired and/or wireless connections with UPF 318.

NSSF 302 can select network slice instances for UE's, where NSSF 302 can determine a set of network slice policies to be applied at the RAN 220. By providing network slicing, NSSF 302 allows an operator to deploy multiple substantially independent end-to-end networks potentially with the same infrastructure. In some implementations, each slice can be customized for different services. NEF 304 can support the exposure of capabilities and/or events in the wireless telecommunications system to help other entities in the wireless telecommunications system discover network services and/or utilize network resources efficiently.

AUSF 306 can act as an authentication server and support the process of authenticating UEs in the wireless telecommunications system. UDM 308 can store subscriber data and profiles in the wireless telecommunications system. UDM 308 can be used for fixed access, mobile access, and/or the like, in core network 300. PCF 310 can provide a policy framework that incorporates network slicing, roaming, packet processing, mobility management, and/or the like.

AF 312 can determine whether UEs provide preferences for a set of network slice policies and support application influence on traffic routing, access to NEF 304, policy control, and/or the like. AMF 314 can provide registration and mobility management of UEs.

SMF 316 can support the establishment, modification, and release of communications sessions in the wireless telecommunications system. For example, SMF 316 can configure traffic steering policies at UPF 318, enforce UE IP address allocation and policies, and/or the like. AMF 314 and SMF 316 can act as a termination point for non-access stratum (NAS) signaling, mobility management, and/or the like. SMF 316 can act as a termination point for session management related to NAS. RAN 220 can send information (e.g. the information that identifies the UE) to AMF 314 and/or SMF 316 via PCF 310. As described herein, SMF 316 can communicate information identifying a QoS flow to UE 210, RAN 220, UPF 318/, and/or the like.

UPF 318 can serve as an anchor point for intra/inter radio access technology (RAT) mobility. UPF 318 can apply rules to packets, such as rules pertaining to packet routing, traffic reporting, handling user plane QoS, and/or the like. UPF 318 can determine an attribute of application-specific data that is communicated in a communications session. UPF 318 can receive information (e.g., the information that identifies the communications attribute of the application) from RAN 220 via SMF 316 or an application programming interface (API). Message bus 320 represents a communication structure for communication among the functional elements. In other words, message bus 320 can permit communication between two or more functional elements. Message bus 320 can be a message bus, a hypertext transfer protocol 2 (HTTP/2) proxy server, and/or the like.

RAN 220 can include a base station and be operatively connected, via a wired and/or wireless connection, to the core network 300 through UPF 318. RAN 220 can facilitate communications sessions between UEs and data network 240 by communicating application-specific data between RAN 220 and core network 300. Data network 240 can include various types of data networks, such as the Internet, a third-party services network, an operator services network, a private network, a wide area network, and/or the like.

The number and arrangement of functional elements shown in FIG. 3 are provided as an example. In practice, there can be additional functional elements, fewer functional elements, different functional elements, or differently arranged functional elements than those shown in FIG. 3. Furthermore, two or more functional elements shown in FIG. 3 can be implemented within a single device, or a single functional element shown in FIG. 3 can be implemented as multiple, distributed devices. Additionally, or alternatively, a set of functional elements (e.g., one or more functional elements) of core network 300 can perform one or more functions described as being performed by another set of functional elements of core network 300.

Figure 4:
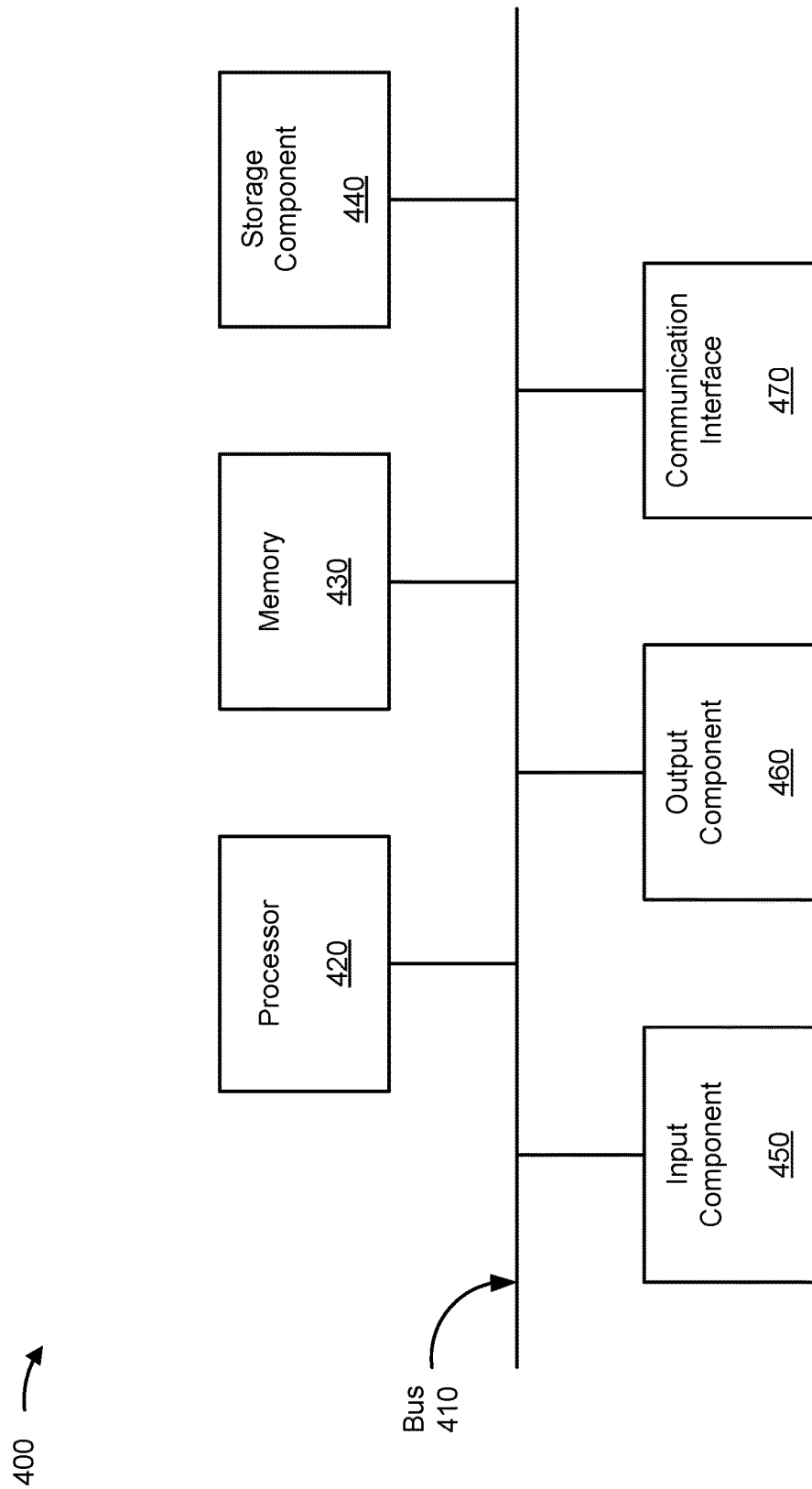
FIG. 4 is a diagram of example components of one or more devices of FIG. 2.

FIG. 4 is a diagram of example components of a device 400. Device 400 can correspond UE 210, base station 222, NSSF 302, NEF 304, AUSF 306, UDM 308, PCF 310, AF 312, AMF 314, SMF 316, UPF 318, and/or message bus 320. In some implementations, UE 210, base station 222, NSSF 302, NEF 304, AUSF 306, UDM 308, PCF 310, AF 312, AMF 314, SMF 316, UPF 318, and/or message bus 320 can include one or more devices 400 and/or one or more components of device 400. As shown in FIG. 4, device 400 can include a bus 410, a processor 420, a memory 430, a storage component 440, an input component 450, an output component 460, and a communication interface 470.

Bus 410 includes a component that permits communication among multiple components of device 400. Processor 420 is implemented in hardware, firmware, and/or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random-access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 can include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 can include a component for determining location (e.g., a global positioning system (GPS) component) and/or a sensor (e.g., an accelerometer, a gyroscope, an actuator, another type of positional or environmental sensor, and/or the like). Output component 460 includes a component that provides output information from device 400 (via, e.g., a display, a speaker, a haptic feedback component, an audio or visual indicator, and/or the like).

Communication interface 470 includes a transceiver-like component (e.g., a transceiver, a separate receiver, a separate transmitter, and/or the like) that enables device 400 to communicate with other devices, such as via a wired connection, a wireless connection, or a combination of wired and wireless connections. Communication interface 470 can permit device 400 to receive information from another device and/or provide information to another device. For example, communication interface 470 can include an Ethernet interface, an optical interface, a coaxial interface, an infrared interface, a radio frequency (RF) interface, a universal serial bus (USB) interface, a wireless local area network interface, a cellular network interface, and/or the like.

Device 400 can perform one or more processes described herein. Device 400 can perform these processes based on processor 420 executing software instructions stored by a non-transitory computer-readable medium, such as memory 430 and/or storage component 440. As used herein, the term "computer-readable medium" refers to a non-transitory memory device. A memory device includes memory space within a single physical storage device or memory space spread across multiple physical storage devices.

Software instructions can be read into memory 430 and/or storage component 440 from another computer-readable medium or from another device via communication interface 470. When executed, software instructions stored in memory 430 and/or storage component 440 can cause processor 420 to perform one or more processes described herein. Additionally, or alternatively, hardware circuitry can be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 can include additional components, fewer components, different components, or differently arranged components than those shown in FIG. 4. Additionally, or alternatively, a set of components (e.g., one or more components) of device 400 can perform one or more functions described as being performed by another set of components of device 400.

Figure 5:
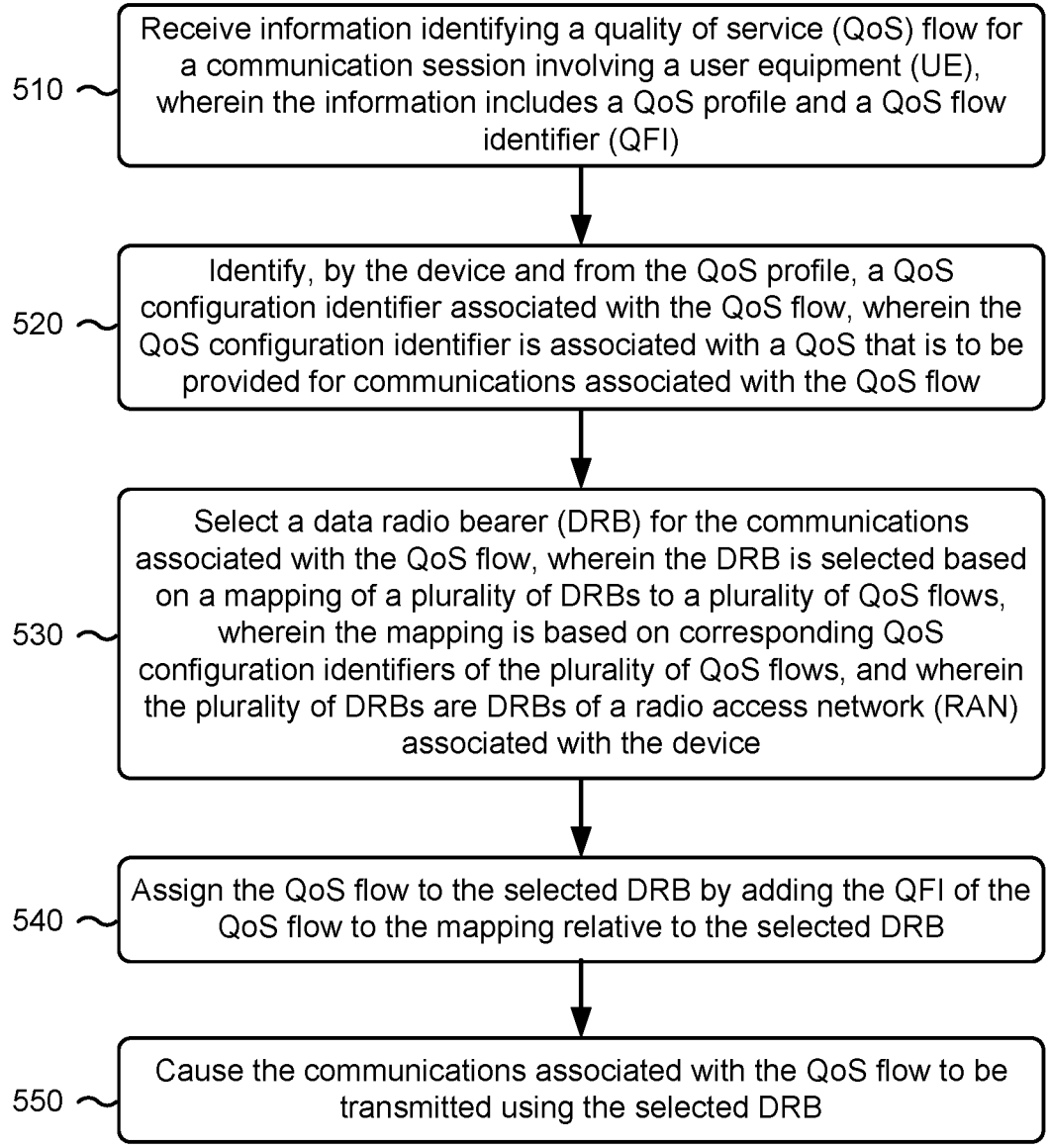
FIG. 5 is a flowchart of an example process associated with allocation of data radio bearers for quality of service flows.

FIG. 5 is a flowchart of an example process 500 associated with allocation of DRBs for quality of service flows. In some implementations, one or more process blocks of FIG. 5 can be performed by a base station (e.g., base station 222) of a RAN (e.g., RAN 220). In some implementations, one or more process blocks of FIG. 5 can be performed by another device or a group of devices separate from or including the base station, such as such as one or more components of a RAN (e.g., RAN 220), one or more components or functions (e.g., NSSF 302, NEF 304, AUSF 306, UDM 308, PCF 310, AF 312, AMF 314, SMF 316, UPF 318) of a core network (e.g., core network 300), and/or the like.

As shown in FIG. 5, process 500 can include receiving information identifying a QoS flow for a communication session involving a UE, wherein the information includes a QoS profile and a QFI (block 510). For example, the base station (e.g., using a processor 420, a memory 430, a storage component 440, an input component 450, and a communication interface 470, and/or the like) can receive information identifying a QoS flow for a communication session involving a UE, as described above. In some implementations, the information includes a QoS profile and a QFI.

As further shown in FIG. 5, process 500 can include identifying, by the device and from the QoS profile, a QoS configuration identifier associated with the QoS flow, wherein the QoS configuration identifier is associated with a QoS that is to be provided for communications associated with the QoS flow (block 520). For example, the base station (e.g., using a processor 420, a memory 430, a storage component 440, an input component 450, and a communication interface 470, and/or the like) can identify, by the device and from the QoS profile, a QoS configuration identifier associated with the QoS flow, as described above. In some implementations, the QoS configuration identifier is associated with a QoS that is to be provided for communications associated with the QoS flow.

As further shown in FIG. 5, process 500 can include selecting a DRB for the communications associated with the QoS flow, wherein the DRB is selected based on a mapping of a plurality of DRBs to a plurality of QoS flows, wherein the mapping is based on corresponding QoS configuration identifiers of the plurality of QoS flows, and wherein the plurality of DRBs are DRBs of a RAN associated with the device (block 530). For example, the base station (e.g., using a processor 420, a memory 430, a storage component 440, an input component 450, and a communication interface 470, and/or the like) can select a DRB for the communications associated with the QoS flow, as described above. In some implementations, the DRB is selected based on a mapping of a plurality of DRBs to a plurality of QoS flows. In some implementations, the mapping is based on corresponding QoS configuration identifiers of the plurality of QoS flows. In some implementations, wherein the plurality of DRBs are DRBs of a RAN associated with the device.

As further shown in FIG. 5, process 500 can include assigning the QoS flow to the selected DRB by adding the QFI of the QoS flow to the mapping relative to the selected DRB (block 540). For example, the base station (e.g., using a processor 420, a memory 430, a storage component 440, an output component 460, and a communication interface 470, and/or the like) can assign the QoS flow to the selected DRB by adding the QFI of the QoS flow to the mapping relative to the selected DRB, as described above.

As further shown in FIG. 5, process 500 can include causing the communications associated with the QoS flow to be transmitted using the selected DRB (block 550). For example, the base station (e.g., using a processor 420, a memory 430, a storage component 440, an output component 460, and a communication interface 470, and/or the like) can cause the communications associated with the QoS flow to be transmitted using the selected DRB, as described above.

Process 500 can include additional implementations, such as any single implementation or any combination of implementations described below and/or in connection with one or more other processes described elsewhere herein.

In some implementations, the mapping provides that each DRB of the plurality of DRBs is to be allocated for QoS flows that have a same QoS configuration identifier. In some implementations, the mapping provides that each DRB of the plurality of DRBs is to be allocated for QoS flows that have a single, same QoS configuration identifier. In some implementations, the mapping provides a first set of DRBs of the plurality of DRBs and a second set of DRBs of the plurality of DRBs. In some implementations, each DRB of the first set of DRBs is to be allocated to QoS flows that have a single, same QoS configuration identifier. In some implementations, at least one DRB of the second set of DRBs is to be allocated to QoS flows that have different QoS configuration identifiers relative to QoS flows assigned to each respective DRB.

In some implementations, the QoS profile includes an allocation and retention priority (ARP) for the QoS flow. In some implementations, the mapping provides that each DRB, of the plurality of DRBs, is to be configured to provide the QoS based on a minimum ARP. In some implementations, the minimum ARP comprises an ARP, of a plurality of ARPs corresponding to the QoS flows that are assigned to the respective DRB, associated with a lowest priority level.

In some implementations, the QoS profile includes a PCI that indicates whether preemption capability is enabled or disabled for the QoS flow. In some implementations, if the PCI indicates that preemption capability is enabled for the QoS flow, the mapping provides that the selected DRB is to provide a QoS that provides preemption capability. In some implementations, the QoS profile includes a PVI that indicates whether preemption vulnerability is enabled or disabled for the QoS flow. In some implementations, if the PVI indicates that preemption vulnerability is enabled for the QoS flow, the mapping provides that the selected DRB is to provide a QoS that provides preemption vulnerability.

In some implementations, the mapping of the plurality of DRBs to the plurality of QoS flows is based on at least one of a guaranteed bitrate (GBR) parameter, a priority level, a packet delay budget, a resource type, a priority level, a default maximum data burst volume, a default averaging window, or a packet error rate.

Although FIG. 5 shows example blocks of process 500, in some implementations, process 500 can include additional blocks, fewer blocks, different blocks, or differently arranged blocks than those depicted in FIG. 5. Additionally, or alternatively, two or more of the blocks of process 500 can be performed in parallel.

The foregoing disclosure provides illustration and description but is not intended to be exhaustive or to limit the implementations to the precise form disclosed. Modifications and variations can be made in light of the above disclosure or can be acquired from practice of the implementations.

As used herein, the term "component" is intended to be broadly construed as hardware, firmware, or a combination of hardware and software.

Some implementations are described herein in connection with thresholds. As used herein, satisfying a threshold can, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein can be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features can be combined in ways not specifically recited in the claims and/or disclosed in the specification. Although each dependent claim listed below can directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    receiving, by a device, information identifying a quality of service (QoS) flow for a communication session involving a user equipment (UE),
        wherein the information includes a QoS profile and a QoS flow identifier (QFI),
            wherein the QoS profile includes one or more QoS parameters,
                wherein the one or more QoS parameters include at least one of a default maximum data burst volume or a default averaging window;
    selecting, by the device, a data radio bearer (DRB) for communications associated with the QoS flow,
        wherein the DRB is selected based on a mapping of a plurality of DRBs to a plurality of QoS flows,
            wherein the plurality of QoS flows each include a respective QoS profile including the one or more QoS parameters,
            wherein the plurality of QoS flows include the QoS flow, and
            wherein the plurality of QoS flows are mapped, within the mapping, according to respective values of the one or more QoS parameters;
    assigning, by the device, the QoS flow to the DRB by adding the QFI of the QoS flow to the mapping relative to the DRB; and
    causing, by the device, the communications associated with the QoS flow to be transmitted using the DRB based on assigning the QoS flow to the DRB.

2. The method of claim 1, wherein the one or more QoS parameters further include a QoS configuration identifier, and
    the mapping provides that each DRB, of the plurality of DRBs, is to be allocated for sets of QoS flows, of the plurality of QoS flows, that have a same QoS configuration identifier.

3. The method of claim 1, wherein the one or more QoS parameters further include a QoS configuration identifier, and
    wherein the mapping provides that each DRB, of the plurality of DRBs, is to be allocated for sets of QoS flows, of the plurality of QoS flows, that have a single, same QoS configuration identifier.

4. The method of claim 1, further comprising:
    determining a similarity between respective values of the one or more QoS parameters of the QoS flow and respective values of the one or more QoS parameters of remaining QoS flows, of the plurality of QoS flows, based on applying one or more scores; and
    wherein selecting the DRB comprises:
        selecting the DRB based on the similarity.

5. The method of claim 1, wherein the one or more QoS parameters further include a QoS configuration identifier, and
    wherein the QoS configuration identifier is configured for one or more types of services associated with the plurality of QoS flows.

6. The method of claim 1, wherein the mapping provides a first set of DRBs of the plurality of DRBs and a second set of DRBs of the plurality of DRBs,
    wherein each DRB of the first set of DRBs is to be allocated to sets of QoS flows, of the plurality of QoS flows, that have a single, same QoS configuration identifier, and
    wherein at least one DRB of the second set of DRBs is to be allocated to at least one set of QoS flows, of the plurality of QoS flows, that have different QoS configuration identifiers.

7. The method of claim 1, wherein the one or more QoS parameters further include at least one of:
    a guaranteed bitrate (GBR) parameter,
    a priority level,
    a packet delay budget,
    a resource type, or
    a packet error rate.

8. A device for wireless communication, comprising:
    one or more processors configured to:
        receive information identifying a quality of service (QoS) flow for a communication session involving a user equipment (UE),
            wherein the information includes a QoS profile and a QoS flow identifier (QFI);
        identify, from the QoS profile, one or more QoS parameters associated with the QoS flow,
            wherein the one or more QoS parameters include at least one of a default maximum data burst volume or a default averaging window;
        select a data radio bearer (DRB) for communications associated with the QoS flow,
            wherein the DRB is selected based on a mapping of a plurality of DRBs to a plurality of QoS flows,
                wherein the plurality of QoS flows each include a respective QoS profile including the one or more QoS parameters,
                wherein the plurality of QoS flows include the QoS flow, and
                wherein the plurality of QoS flows are mapped, within the mapping, according to respective values of the one or more QoS parameters;

assign the QoS flow to the DRB by adding the QFI of the QoS flow to the mapping relative to the DRB; and cause the communications associated with the QoS flow to be transmitted using the DRB based on assigning the QoS flow to the DRB.

9. The device of claim 8, wherein the one or more QoS parameters further include a QoS configuration identifier, and wherein the QoS configuration identifier is configured for one or more types of services associated with the plurality of QoS flows.

10. The device of claim 8, wherein the one or more processors are further to:

determine a similarity between respective values of the one or more QoS parameters of the QoS flow and respective values of the one or more QoS parameters of remaining QoS flows, of the plurality of QoS flows, based on applying one or more scores; and wherein the one or more processors, when selecting the DRB, are to:

select the DRB based on the similarity.

11. The device of claim 8, wherein the mapping provides a first set of DRBs of the plurality of DRBs and a second set of DRBs of the plurality of DRBs, wherein each DRB of the first set of DRBs is to be allocated to sets of QoS flows, of the plurality of QoS flows, that have a single, same QoS configuration identifier, and wherein at least one DRB of the second set of DRBs is to be allocated to at least one set of QoS flows, of the plurality of QoS flows, that have different QoS configuration identifiers.

12. The device of claim 8, wherein the QoS profile includes an allocation and retention priority (ARP) for the QoS flow, and wherein the mapping provides that each DRB, of the plurality of DRBs, is to be configured to provide a QoS based on a minimum ARP.

13. The device of claim 8, wherein the QoS profile includes at least one of:

a preemption capability indication (PCI) that indicates whether preemption capability is enabled or disabled for the QoS flow, wherein, if the PCI indicates that preemption capability is enabled for the QoS flow, the mapping provides that the DRB is to provide a QoS that provides preemption capability, or a preemption vulnerability indication (PVI) that indicates whether preemption vulnerability is enabled or disabled for the QoS flow, wherein, if the PVI indicates that preemption vulnerability is enabled for the QoS flow, the mapping provides that the DRB is to provide a QoS that provides preemption vulnerability.

14. The device of claim 8, wherein the one or more QoS parameters further include at least one of:

a guaranteed bitrate (GBR) parameter,
a priority level,
a packet delay budget,
a resource type, or
a packet error rate.

15. A non-transitory computer-readable medium storing instructions that, when executed by one or more processors of a device, cause the one or more processors to:

obtain information identifying a quality of service (QoS) flow for a communication session involving a user equipment (UE), wherein the information includes a QoS profile having one or more QoS parameters, wherein the one or more QoS parameters include at least one of a default maximum data burst volume or a default averaging window;

select a data radio bearer (DRB) for the communications associated with the QoS flow, wherein the DRB is selected based on a mapping of a plurality of DRBs to a plurality of QoS flows, wherein the plurality of QoS flows each include a respective QoS profile including the one or more QoS parameters, wherein the plurality of QoS flows include the QoS flow, and wherein the plurality of QoS flows are mapped, within the mapping, according to respective values of the one or more QoS parameters;

assign the QoS flow to the DRB; and cause the communications associated with the QoS flow to be transmitted using the DRB based on assigning the QoS flow to the DRB.

16. The non-transitory computer-readable medium of claim 15, wherein the none or more QoS parameters further include at least one of:

a guaranteed bitrate (GBR) parameter,
a priority level,
a packet delay budget,
a resource type, or
a packet error rate.

17. The non-transitory computer-readable medium of claim 15, wherein the mapping provides that each DRB, of the plurality of DRBs, is to be allocated for sets of QoS flows, of the plurality of QoS flows, that have a single, same QoS configuration identifier.

18. The non-transitory computer-readable medium of claim 15, wherein the mapping provides that at least one DRB, of the first sctplurality of DRBs, is to be allocated for sets of QoS flows, of the plurality of QoS flows, that have a single, same QoS configuration identifier.

19. The non-transitory computer-readable medium of claim 15, wherein the QoS profile includes an allocation and retention priority (ARP) for the QoS flow, and wherein the mapping provides that each DRB, of the plurality of DRBs, is to be configured to provide a QoS based on a minimum ARP.

20. The non-transitory computer-readable medium of claim 15, wherein the QoS profile includes at least one of:

a preemption capability indication (PCI) that indicates whether preemption capability is enabled or disabled for the QoS flow, wherein, if the PCI indicates that preemption capability is enabled for the QoS flow, the mapping provides that the DRB is to provide a QoS that provides preemption capability, or a preemption vulnerability indication (PVI) that indicates whether preemption vulnerability is enabled or disabled for the QoS flow, wherein, if the PVI indicates that preemption vulnerability is enabled for the QoS flow, the mapping provides that the DRB is to provide a QoS that provides preemption vulnerability.

* * * * *